(12) United States Patent
Hashigaya et al.

(10) Patent No.: US 6,752,968 B2
(45) Date of Patent: Jun. 22, 2004

(54) REFORMER CONTROLLING APPARATUS

(75) Inventors: Hiroaki Hashigaya, Kanagawa-ken (JP); Katsunori Oshiage, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 206 days.

(21) Appl. No.: 09/776,855

(22) Filed: Feb. 6, 2001

(65) Prior Publication Data

US 2001/0014300 A1 Aug. 16, 2001

(30) Foreign Application Priority Data

Feb. 16, 2000 (JP) ...................... P2000-038412

(51) Int. Cl.[7] .............. G05D 7/00; G05D 23/00; G05B 13/00; G05B 19/00
(52) U.S. Cl. ................. 422/110; 422/105; 422/107; 422/108; 422/188; 48/127.9
(58) Field of Search ................... 422/188, 189, 422/190, 191, 193, 105, 107, 108, 110, 111; 48/61, 127.9

(56) References Cited

U.S. PATENT DOCUMENTS 4,002,150 A * 1/1977 Shinohara et al. ............. 123/3
6,117,577 A * 9/2000 Wilson ......................... 429/17
6,165,633 A * 12/2000 Negishi ........................ 429/17

FOREIGN PATENT DOCUMENTS

JP  11-092102  4/1999

* cited by examiner

Primary Examiner—Jerry D. Johnson
Assistant Examiner—Alexa Doroshenk
(74) Attorney, Agent, or Firm—Foley & Lardner LLP

(57) ABSTRACT

A reaction state at an upstream portion of the catalyst unit in which a partial oxidation reaction occurs is detected by a first reaction state detector, and a reforming reaction state in the whole of the catalyst unit composed of a catalyst for promoting a steam reforming reaction and a catalyst for promoting a partial oxidation reaction is detected by a second reaction state detector. Based on a reaction state detected by the second reaction state detector, a first corrector corrects feed amounts of raw fuel gas and oxidation gas, which are supplied to the catalyst unit, and a second corrector corrects a feed amount of the oxidation gas supplied to the catalyst unit and/or a feed timing thereof, based on the reaction state detected by the first reaction state detector.

6 Claims, 13 Drawing Sheets

REFORMER CONTROLLING APPARATUS

BACKGROUND OF THE INVENTION

The present invention relates to a reformer controlling apparatus in a fuel cell power generation system.

As a reformer controlling apparatus in a conventional fuel cell power generation system, there has heretofore been the one disclosed in Japanese Patent Laid-Open No. H11-92102. In this conventional reformer controlling apparatus, a fuel reformer uses the air as oxidation gas, and methanol is made to perform either a steam reforming reaction or a partial oxidation reaction, followed by generation of hydrogen rich reformer gas. Thus, the hydrogen rich reformer gas is supplied as fuel gas for a fuel cell.

A reaction formula expressing steam reforming of methanol is shown below.

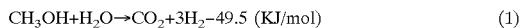
$$CH_3OH + H_2O \rightarrow CO_2 + 3H_2 - 49.5 \text{ (KJ/mol)} \qquad (1)$$

As shown in the Equation (1), since the steam reforming reaction is an endothermic reaction, it is necessary to supply heat energy to progress the reforming reaction. To supply this heat energy, a method is employed, in which the methanol is made to perform the partial oxidation reaction that is an exothermic reaction, and the steam reforming reaction is progressed by using heat generated in the partial oxidation reaction. A reaction formula expressing the partial oxidation reaction of methanol is shown below.

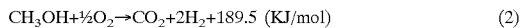
$$CH_3OH + \tfrac{1}{2}O_2 \rightarrow CO_2 + 2H_2 + 189.5 \text{ (KJ/mol)} \qquad (2)$$

As shown in the Equation (2), the partial oxidation reaction is an exothermic reaction.

SUMMARY OF THE INVENTION

However, the partial oxidation reaction shows a reaction rate faster than that of the steam reforming reaction. For this reason, in a method in which oxidation gas is supplied to a fuel reformer together with methanol and steam, and heat energy produced in the partial oxidation reaction is utilized in the steam reforming reaction, there has been a problem that a temperature distribution is uneven in the interior of the fuel former particularly in a transient state. Specifically, on an upstream portion in the fuel reformer, that is, on a portion where gas containing methanol, steam and oxidation gas is introduced, a temperature in the interior of the fuel reformer rapidly rises to form a peak of the temperature distribution, resulting in unevenness of a temperature distribution state.

To cope with this problem, the conventional reformer apparatus comprises means for determining a quantity of oxygen to be supplied to a fuel reformer based on a driving quantity of a pump for supplying methanol from a methanol tank to an evaporator, which makes methanol and water evaporate, and oxygen concentration regulation means for controlling an oxygen concentration in oxidation gas to be supplied to the fuel reformer. In the conventional reformer controlling apparatus, when a temperature on an upstream portion of the fuel reformer rises to a specified value or more, the oxygen concentration in the oxidation gas is reduced without changing the quantity of oxygen, and, to the contrary, a flow amount of the oxidation gas is increased, whereby a partial oxidation reaction on the upstream portion of the fuel reformer is suppressed. At the same time, a flow rate of the gas in the interior of the fuel reformer is increased, whereby an area where the partial oxidation reaction is chiefly performed is made to be broadened to a down stream portion of the fuel reformer. Thus, a temperature distribution in the fuel reformer is made to be uniform.

Incidentally, in such conventional reformer controlling apparatus, the concentration of oxygen in the oxidation gas is controlled without changing the quantity of oxygen depending on a temperature of the fuel reformer. Accordingly, if an error occurs in feed amounts of methanol and steam supplied to the fuel reformer, the quantity of oxygen supplied to the fuel reformer is either too much or too little, and this causes abnormality in a temperature of the whole of the fuel reformer. There have been problems of stopping the reforming reaction and exhausting unreacted gas from the fuel reformer.

A case where an output is increased is considered. The driving quantity of the pump for supplying the methanol from a methanol tank to an evaporator increases. In accordance with the increase in the driving quantity of the pump, the quantity of oxygen supplied to the fuel reformer also increases. Nevertheless, the supply of methanol to the fuel reformer is delayed for a time when the methanol evaporates in the evaporator. The fuel reformer is operated in an oxygen rich state during the evaporation of the methanol. As a result, a temperature at the upstream portion of the fuel reformer rises. In response to the temperature rise of the fuel reformer, the oxygen concentration is decreased to increase in gas flow rate within the fuel reformer. However, when a quantity of methanol enough to consume the oxygen supplied to the fuel reformer is not supplied, only the partial oxidation reaction is performed in the fuel reformer, and the temperature in the whole of the fuel reformer rises. Thus, the oxygen concentration in the oxygen gas is more decreased, and hence the gas flow rate within the fuel reformer is made to be faster. The unreacted gas such as the methanol, the steam and the surplus oxygen is exhausted from the fuel reformer.

The present invention has been made in consideration of the above-described problems. The object of the present invention is to provide a reformer controlling apparatus capable of controlling a ratio of reactions in the whole of a catalyst unit to those in other units, particularly a ratio of the partial oxidation reaction to other reactions, to a desired value, and capable of performing a stable reforming reaction without producing a local high temperature state in the catalyst unit particularly during a transient state in which an output is changed.

To achieve the above object, a reformer controlling apparatus of the present invention is provided with a reformer having a catalyst unit composed of a catalyst for promoting a steam reforming reaction and a catalyst for promoting a partial oxidation reaction, a raw fuel gas supplier supplying raw fuel gas containing hydrocarbon and steam to the catalyst unit, an oxidation gas supplier for supplying oxidation gas containing oxygen to the catalyst unit, a first reaction state detector detecting a state of a reaction progressing at an upstream portion of flows of the raw fuel gas and the oxidation gas within the catalyst unit, a second reaction state detector detecting a state of a reaction of the whole of the catalyst within the catalyst unit, a first corrector correcting feed amounts of the raw fuel gas and the oxidation gas supplied to the catalyst unit based on the state of the reaction detected by the second reaction state detector, and a second corrector correcting the feed amount of the oxidation gas supplied to the catalyst unit and/or a feed timing thereof based of the state of the reaction detected by the first reaction state detector.

In other words, a reformer controlling apparatus of the present invention is provided with a reformer having a catalyst unit including a catalyst for promoting a steam reforming reaction and a catalyst for promoting a partial oxidation reaction, raw fuel gas supplying means for supplying raw fuel gas containing hydrocarbon and steam to said catalyst unit, oxidation gas supplying means for supplying oxidation gas containing oxygen to said catalyst unit, first reaction state detecting means for detecting a state of a reaction progressing at an upstream portion of flows of said raw fuel gas and said oxidation gas in said catalyst unit, second reaction state detecting means for detecting a state of a reaction in the whole of the catalysts in said catalyst unit, first correcting means for correcting feed amounts of said raw fuel gas and said oxidation gas, which are supplied to said catalyst unit, based on said state of the reaction detected by said second reaction state detecting means, and second correcting means for correcting the feed amount of said oxidation gas, which is supplied to said catalyst unit and/or a feed timing thereof, based on said state of the reaction detected by said first reaction state detecting means.

Beside, a method of controlling a reformer produces promoting a steam reform reaction and a partial oxidation reaction in a catalyst unit of said reformer, supplying raw fuel gas containing hydrocarbon and steam to said catalyst unit by a raw fuel supplier, supplying oxidation gas containing oxygen to said catalyst unit by an oxidation gas supplier, detecting a state of a reaction progressing at an upstream portion of flows of said raw fuel gas and said oxidation gas in said catalyst unit by a first reaction state detector, detecting a state of a reaction in the whole of the catalysts in said catalyst unit by a second reaction state detector, correcting feed amounts of said raw fuel gas and said oxidation gas, which are supplied to said catalyst unit by a first corrector, based on said state of the reaction detected by said second reaction state detector, and correcting the feed amount of said oxidation gas, which is supplied to said catalyst unit and/or a feed timing thereof by a second corrector, based on said state of the reaction detected by said first reaction state detector.

DETAILED DESCRIPTION OF THE EMBODIMENTS

Figure 1:
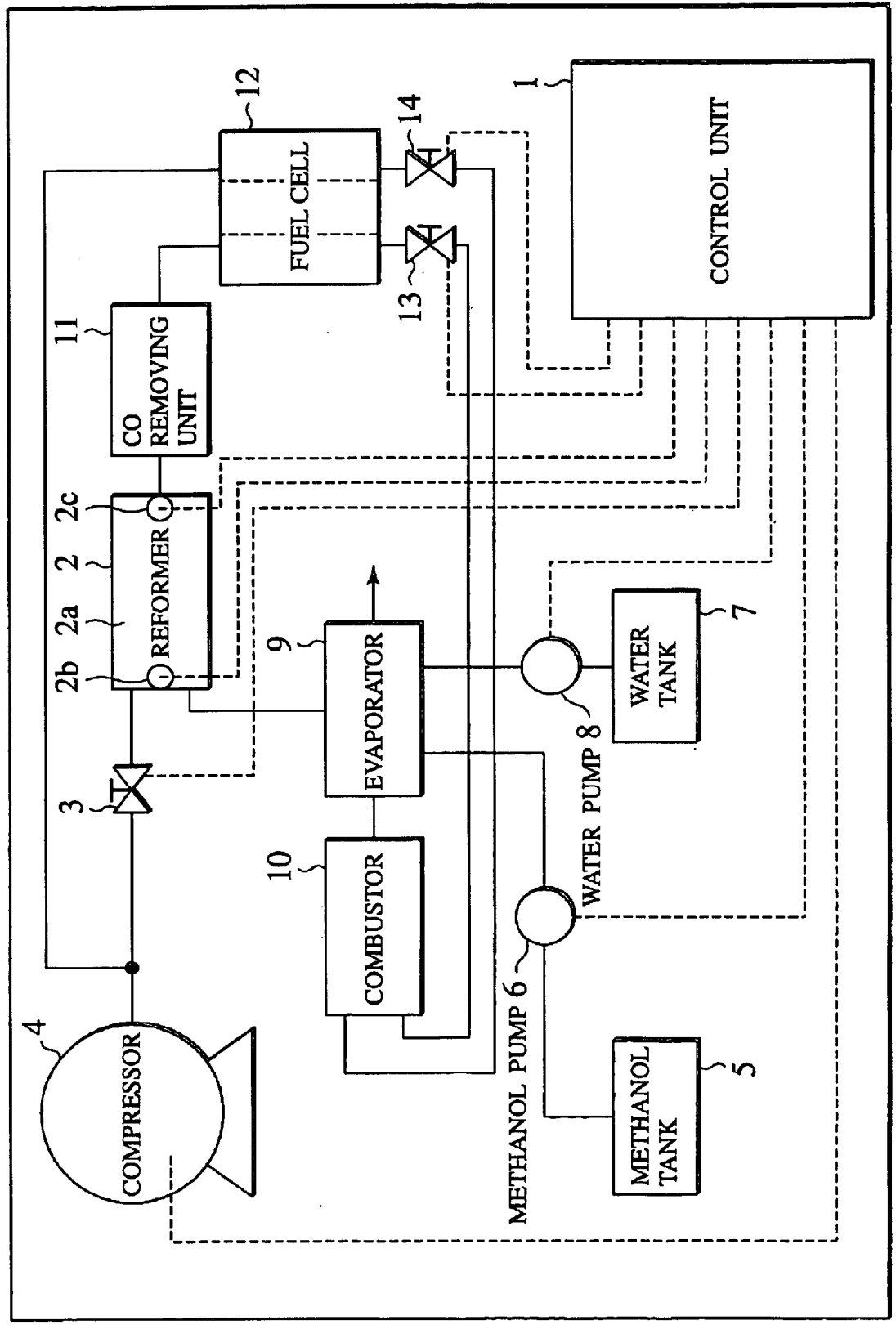
FIG. 1 is a block diagram showing a constitution of a fuel cell power generation system loading a reformer controlling apparatus of a first embodiment of the present invention.

Hereinafter, embodiments of the present invention will be described in detail with reference to the drawings. FIG. 1 shows a constitution of a fuel cell power generation system comprising a reformer controlling apparatus of a first embodiment of the present invention. As main elements, the fuel cell power generation system comprises: a control unit 1 composed of a computer; a reformer 2 producing fuel gas by reforming reaction; a flow control valve 3 controlling air flow as an oxidation gas introduced into the reformer 2; a compressor 4; a methanol tank 5 storing methanol; a methanol pump 6; a water tank 7 storing water; a water pump 8; an evaporator 9; a combustor 10; a CO removing unit 11 removing CO in the reformed gas generated in the reformer 2; a fuel cell 12 taking electromotive force by electrochemical reaction; a reformed gas pressure control valve 13 controlling a fuel gas pressure in the fuel cell 12; and an air pressure control valve 14 controlling an air pressure in the fuel cell 12.

Among the elements described above, the compressor 4 supplies air as an oxidation gas to the reformer 2 and the fuel cell 12. The methanol pump 6 supplies the evaporator 9 with methanol in the methanol tank 5. The water pump 8 supplies the evaporator 9 with water in the water tank 7. The evaporator 9 supplies the reformer 2 with water and methanol as raw fuel gas, which are evaporated by heat supplied from the combustor 10. The combustor 10 generates combustion gas, which is supplied to the evaporator 9.

Figure 2:
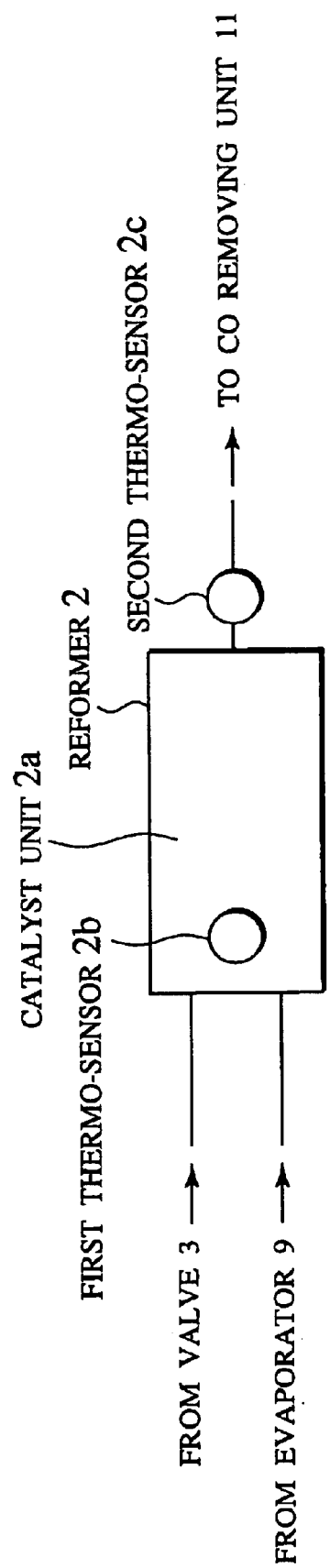
FIG. 2 is a block diagram showing a constitution of a reformer in the first embodiment.

FIG. 2 shows a constitution of the reformer 2 in a first embodiment. The reformer 2 progresses a steam reforming reaction to produce hydrogen from hydrocarbon and steam, which is endothermic, and a partial oxidation reaction to oxidize hydrocarbon, which is exothermic, and utilizes heat generated by the partial oxidation reaction during the progress of the steam reforming reaction. The reformer 2 comprises: a catalyst unit 2a generating the steam reforming/partial oxidation reaction; a first thermo-sensor 2b for measuring a temperature of an upstream portion of the reformer where the partial oxidation reaction is mainly occurring; and a second thermo-sensor 2c for measuring the temperature of the fuel gas at the exit of the reformer 2 in order to grasp the overall reaction state of the reformer.

Figure 3:
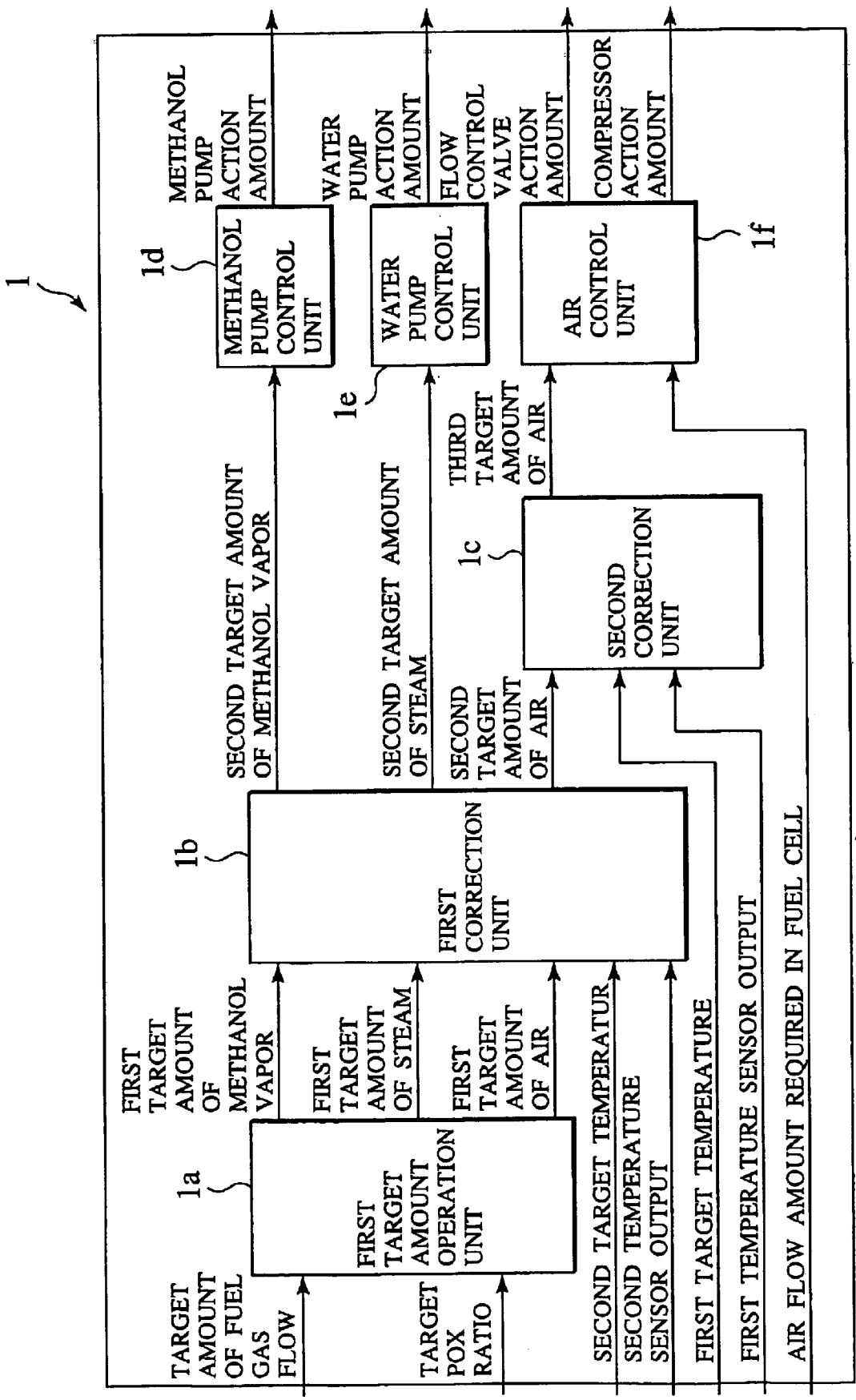
FIG. 3 is a block diagram showing a constitution of a controlling unit in the first embodiment.

FIG. 3 shows a constitution of the control unit 1 in the first embodiment. The control unit 1 comprises: a first target amount operation unit 1a for operating a first target; a first correction unit 1b for performing a first correction for the first target amount of methanol vapor, the first target amount of steam and the first target amount of air in accordance with an output of the second thermo-sensor 2c and a second target temperature; a second correction unit 1c for performing the correction for a second target amount of air in accordance with the output of the first thermo-sensor 2b and the first target temperature; a methanol pump control unit 1d for controlling the methanol pump 6 in accordance with the second target amount of methanol vapor; a water pump control unit 1e for controlling the water pump 8 in accordance with the second target amount of steam; and an air control unit 1f for controlling the compressor 4 and the flow control valve 3 in accordance with a third target amount of air and the air flow required in the fuel cell.

Next, an action of the reformer controlling apparatus of the first embodiment with the above constitution will be described. First, the actions in steady and semi-steady conditions will be described. From the outside, the control unit 1 is provided with: for example, a target fuel gas flow operated based on an accelerator stepping-on measurement; a target value (target POX ratio) of a ratio of partial oxidation reaction and steam reforming reaction (herein, the target POX ratio is represented as: POX ratio=the amount of partial oxidation reaction/(the amount of partial oxidation reaction+the amount of steam reforming reaction); a first target temperature for a temperature measured by the first thermo-sensor 2b; the second target temperature for a temperature measured by the second thermo-sensor 2c; and an air flow required in the fuel cell for the fuel cell 12.

The first target amount operation unit 1a of the control unit 1 computes the first target amount of methanol vapor, the first target amount of steam and the first target amount of air, which should be supplied to the reformer 2, based on the target fuel gas flow to be input and target POX ratio, to output these computed amounts to the first correction unit 1b.

Figure 4:
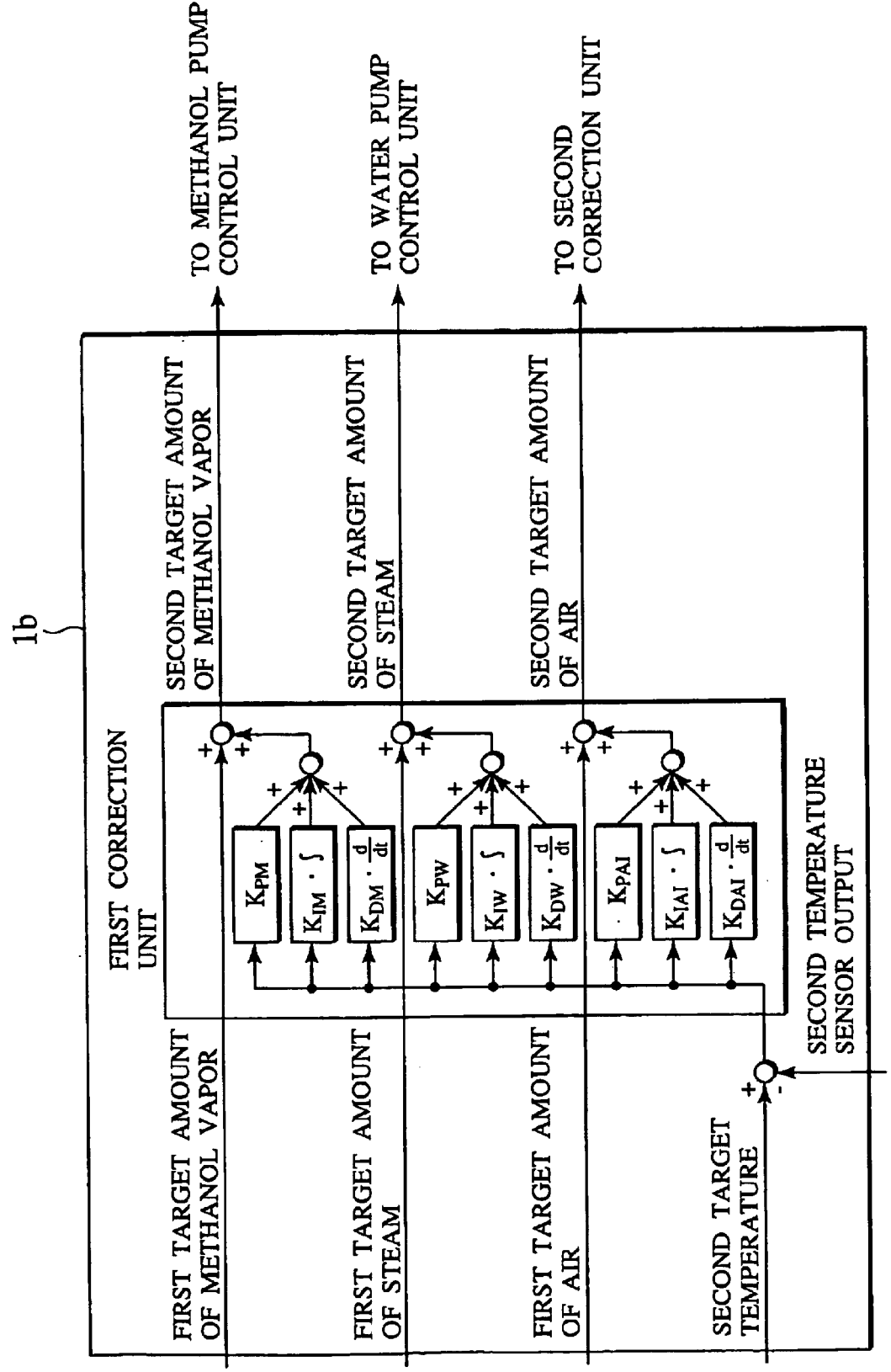
FIG. 4 is a block diagram showing a constitution of a first correction unit in the first embodiment.

The first correction unit 1b performs the first correction by using logic of PID control as shown in FIG. 4. Specifically, the first correction unit 1b performs the first correction operation for the first target amount of methanol vapor, the first target amount of steam and the first target amount of air that are input from the first target amount operation unit 1a based on a deviation between the output of the second thermo-sensor 2c and the second target temperature. Then, the second target amount of methanol vapor, the second target amount of steam and the second target amount of air, which are obtained from the first correction operation, are output to the methanol pump control unit 1d, to the water pump control unit 1e and to the second correction unit 1c, respectively.

The methanol pump control unit 1d controls the action of the methanol pump 6 based on the second target amount of methanol vapor from the first correction unit 1b, and the water pump control unit 1e controls the action of the water pump 8 based on the second target amount of steam.

Note that, in this embodiment, while the first correction unit 1b uses the logic of PID control shown in FIG. 4, techniques other than this method such as a model matching control can be used.

Figure 5:
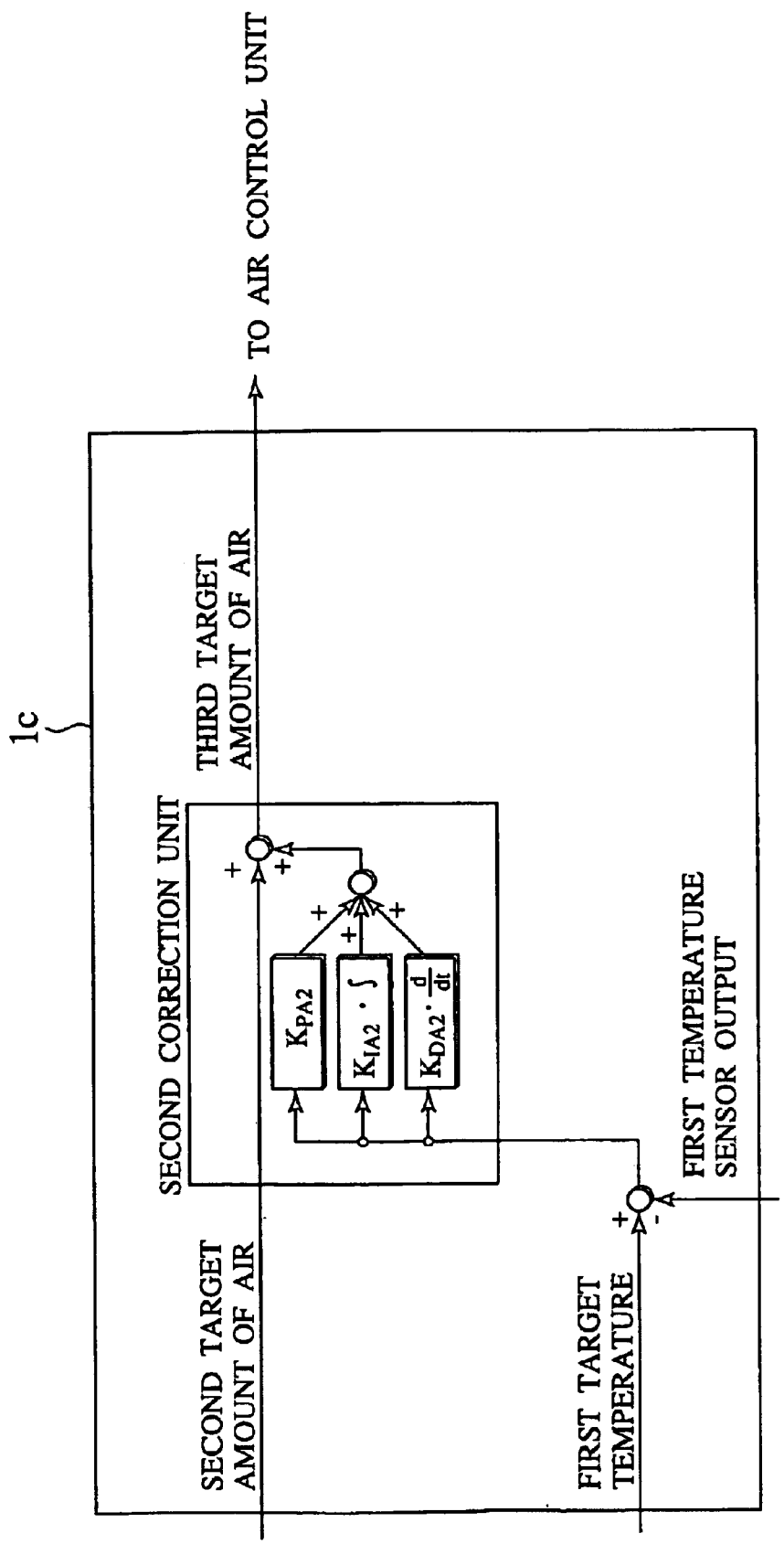
FIG. 5 is a block diagram showing a constitution of a second correction unit in the first embodiment.

The second correction unit 1c performs a second correction for the second target amount of air that has been corrected by the first correction unit 1b by using the logic of PID control as shown in FIG. 5, and computes a third target amount of air. Specifically, the second correction unit 1c performs a second correction operation for the second target amount of air from the first correction unit 1b, based on the deviation between the output of the first thermo-sensor 2b and the first target temperature from outside. Then, a third target amount of air, which is obtained from the second correction operation, is output to the air control unit 1f.

Note that the model matching control technique, for example, can also be employed for the logic used for this second correction operation, other than the PID control logic. The air control unit 1f controls the actions of the flow control valve 3 and the compressor 4 based on the third target amount of air from the second correction unit 1c and the amount of air required in the fuel cell 12 (the air flow required in the fuel cell) input from outside.

Next, the action of the control unit 1 in a transient state will be described. Herein, as an example, description will be made for an action thereof in a transient state in the case where the target amount of fuel gas provided from the outside is increased.

When the target amount of fuel gas is increased, the first target amount of methanol vapor, the first target amount of steam, and the first target amount of air, which are obtained from the reaction formulas (1) and (2), are all increased. The state of each actual flow at this time is illustrated in FIG. 6.

Figure 6:
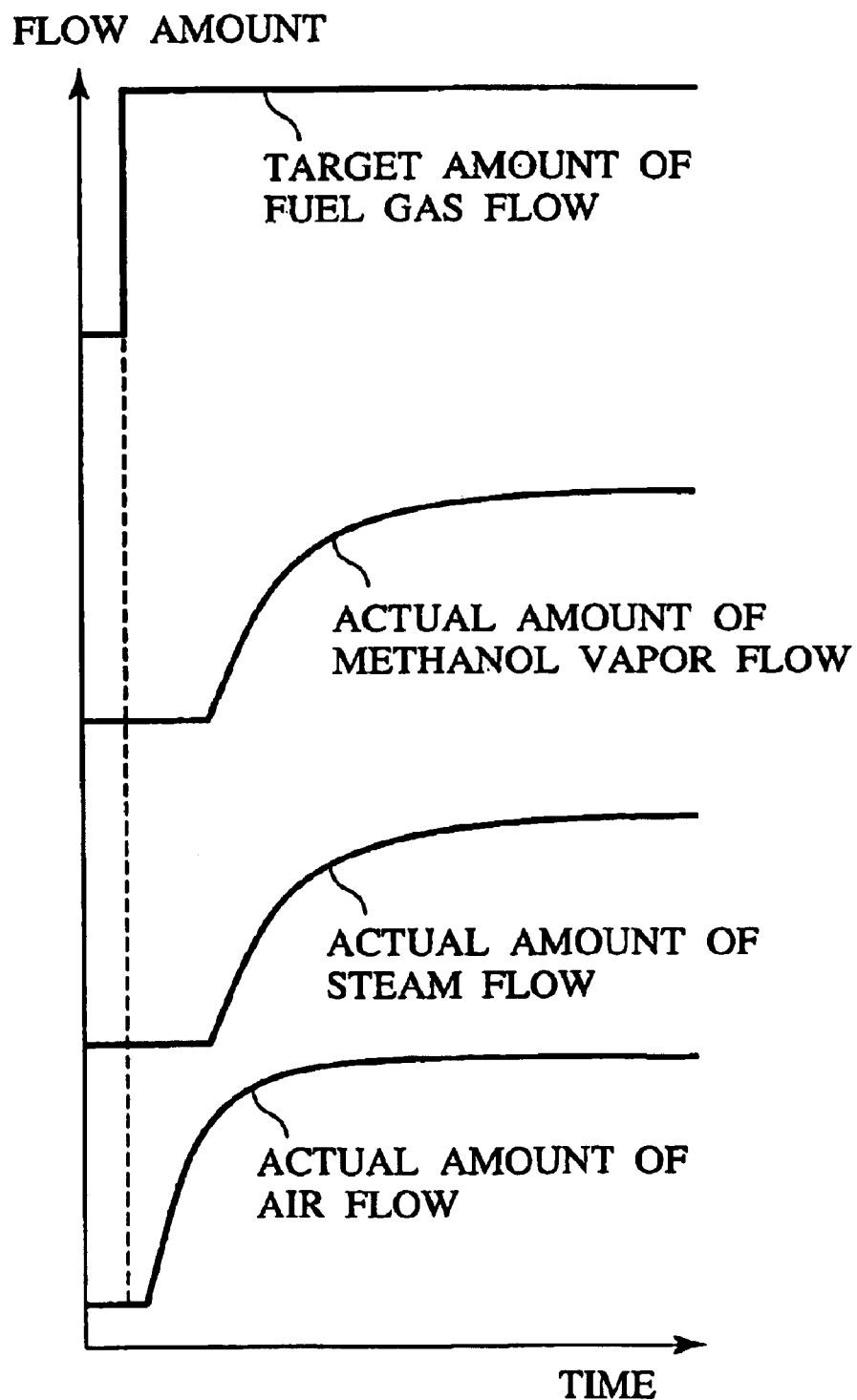
FIG. 6 is a graph showing a response characteristic of an actual flow amount of various gases in the reformer before a correction.

As shown in FIG. 6, the flow of air actually supplied to the reformer 2 is relatively small in its delay. On the contrary, those of methanol vapor and steam have larger delay, influenced by the evaporation delay in the evaporator 9 or the like. If methanol vapor, steam and air are supplied to the reformer 2 in this state shown in FIG. 6, excessive partial oxidation reaction occurs in the upstream portion of the reformer 2, which raises the temperature of the portion. As a result, it may cause a bad influence such that the reformer 2 is damaged meltingly.

Figure 7:
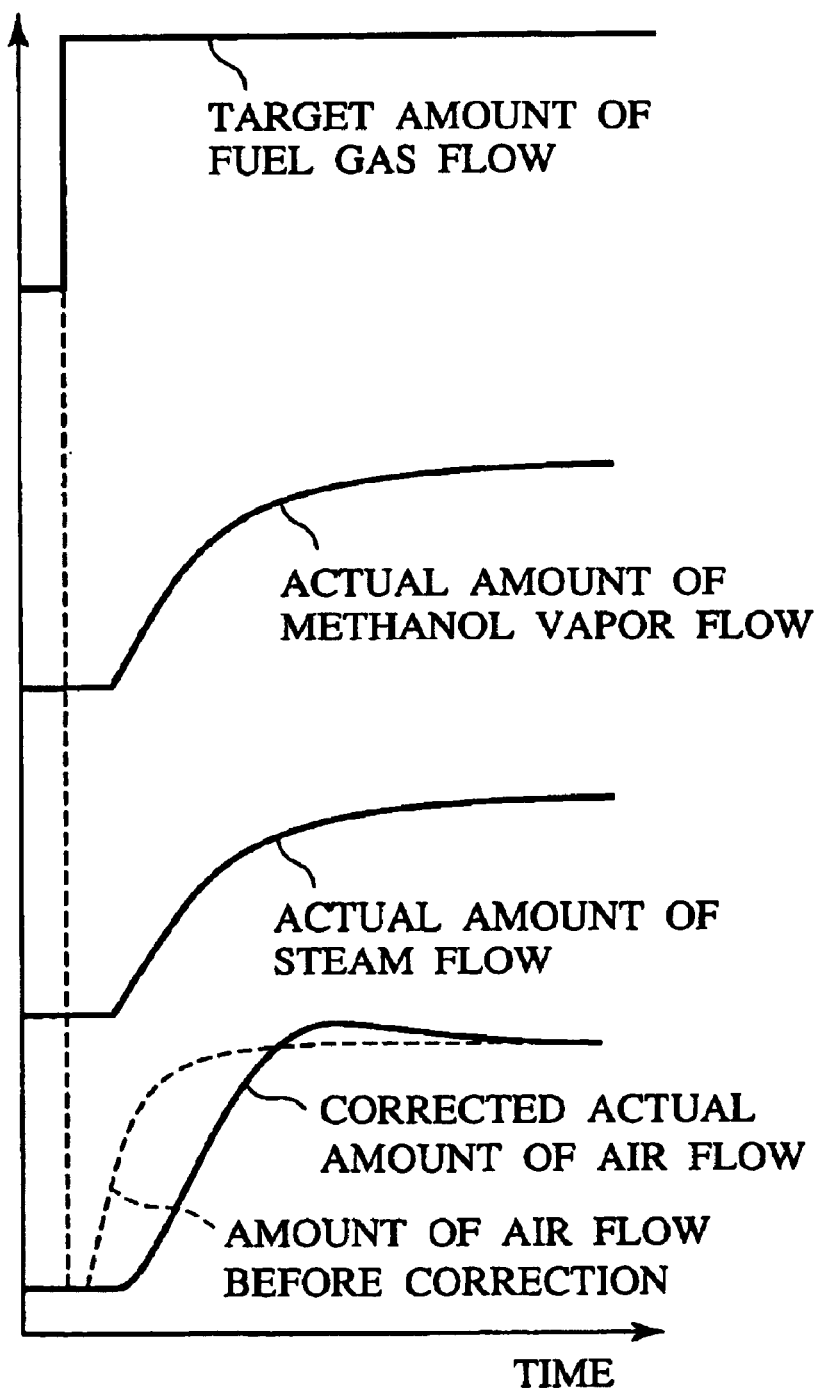
FIG. 7 is a graph showing a response characteristic of an actual flow amount of the various gases in the reformer after a correction is performed in the first embodiment.

Although the temperature control of fuel gas by the first correction is performed in this circumstance, the changes of the amount of methanol vapor and the amount of steam, which are supplied to the reformer 2, are slow in response as illustrated in FIG. 6. Accordingly, the flow of air supplied to the reformer 2 is corrected by the second correction unit 1c, based on the temperature of the upstream portion of the reformer 2 where the partial oxidation reaction mainly occurs. The state of each practical flow at this time is illustrated in FIG. 7.

The first and second corrections are performed in such a manner, thus the temperature of the fuel gas can be kept in an appropriate range.

Figure 8:
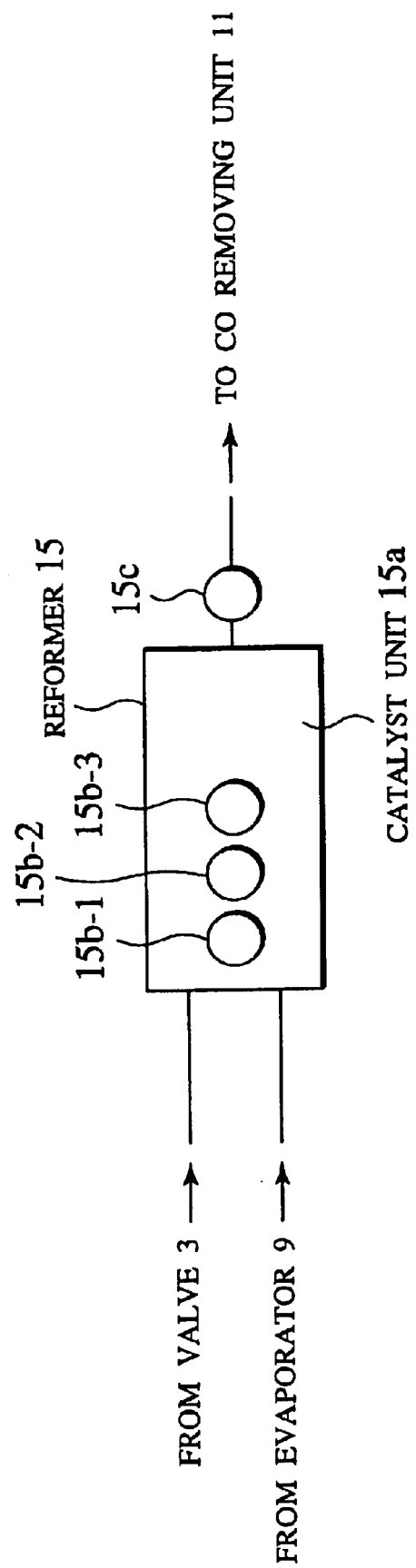
FIG. 8 is a block diagram showing a constitution of a reformer in a second embodiment.

Next, a second embodiment of the present invention will be described with reference to FIG. 8. FIG. 8 schematically shows a constitution of a reformer 15 in the second embodiment. This reformer 15 is provided in the fuel cell power generation system with the constitution which is substantially the same as that of the fuel cell power generation system of the first embodiment shown in FIG. 1. Accordingly, the following constitutional elements being in common with the first embodiment will be described by using the common reference numerals.

Although, in the above-described first embodiment, only one first thermo-sensor was installed in the upstream portion of the reformer as shown in FIG. 2, with regard to the reformer 15 of the second embodiment, it is characterized in that first thermo-sensors are installed in plural places (three places in this case) in order to measure the temperature of the upstream portion of the reformer where the partial oxidation reaction mainly occurs. Therefore, as shown in FIG. 8, the reformer 15 in the second embodiment comprises: a catalyst unit 15a that generates steam reforming/partial oxidation reaction; three first thermo-sensors 15b-1, 15b-2 and 15b-3 for measuring the temperatures of the upstream portion of the reformer where the partial oxidation reaction mainly occurs; and a second thermo-sensor 15c for measuring the temperature of the fuel gas immediately after the reformer 15 in order to detect the entire reaction state of the reformer 15.

Figure 9:
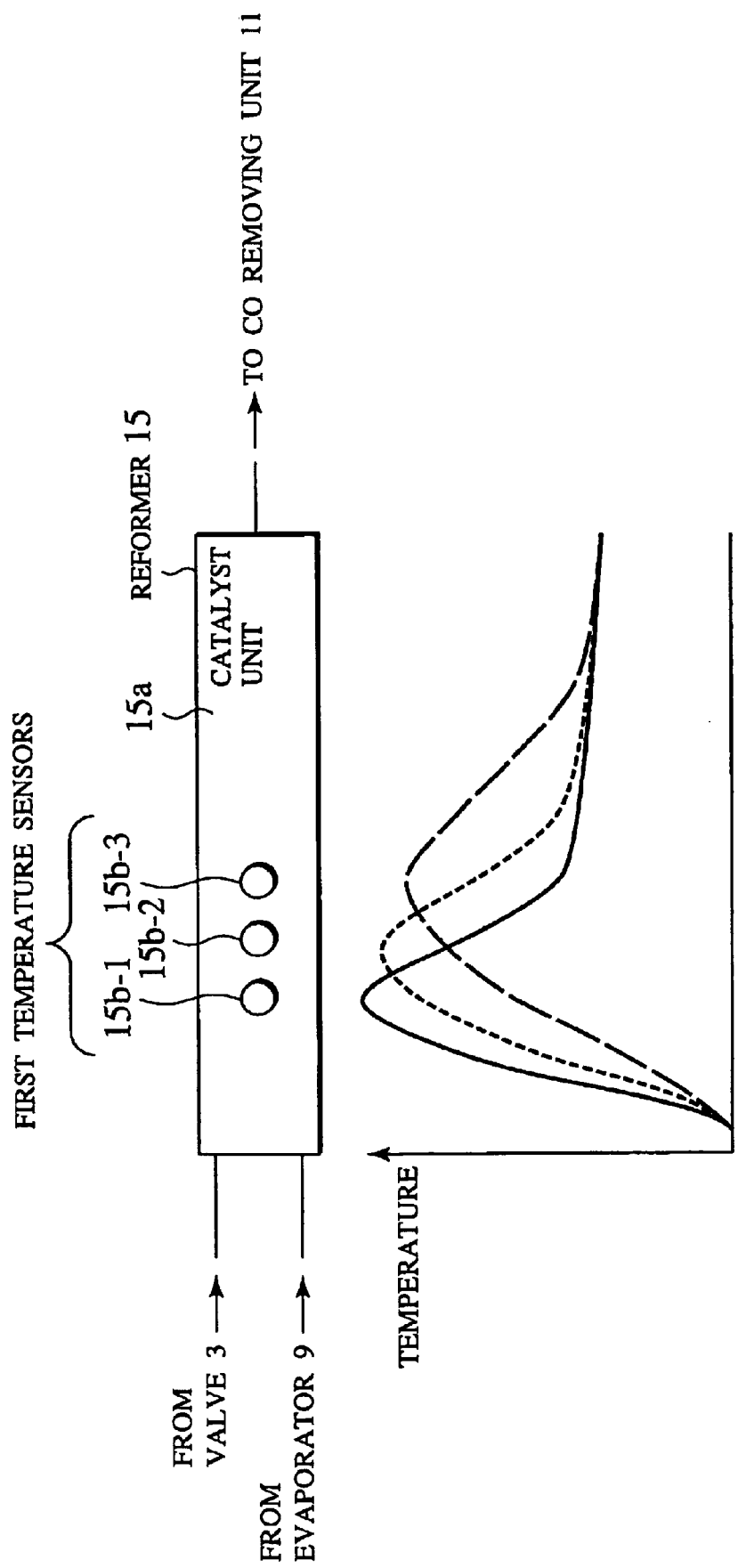
FIG. 9 is an explanatory view showing a temperature distribution of each unit in the reformer in the second embodiment.

As shown in FIG. 9, if the period of time when the reformer is being used passes, the temperature distribution in the reformer 15 is changed in accordance with the passage of the period of time described above because of reasons including catalyst deterioration. Accordingly, the second correction unit 1c in the control unit 1having the constitution shown in FIG. 3 performs a second correction by switching employed outputs with the passage of time among the outputs of the plural first thermo-sensors 15b-1 to 15b-3.

Figure 10:
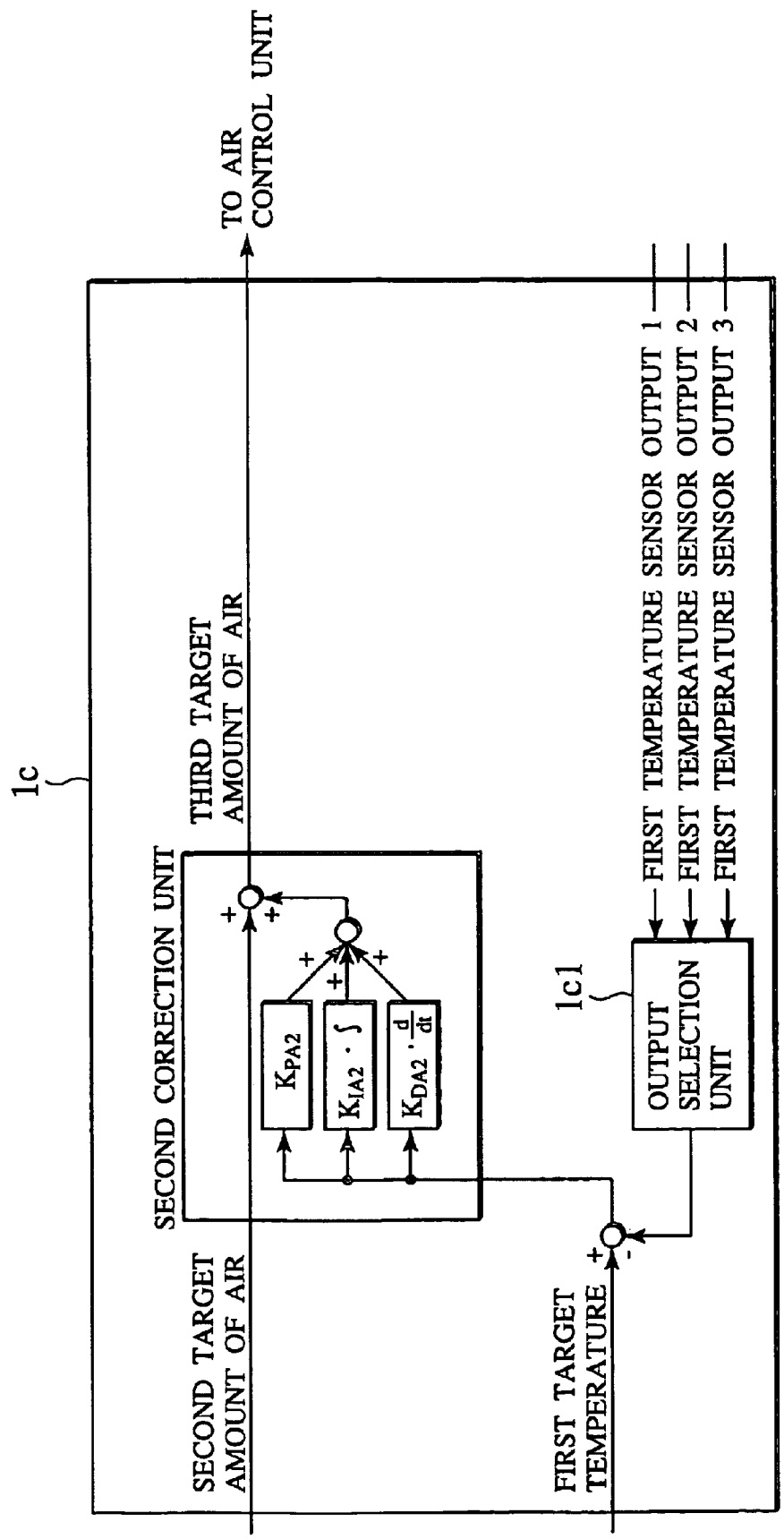
FIG. 10 is a block diagram showing a constitution of a second correction unit in the second embodiment.

The operation logic of the second correction unit 1c in the second embodiment is shown in FIG. 10. The operation logic of FIG. 10 also performs the second correction according to the PID control logic similarly to the second correction unit 2 in the first embodiment shown in FIG. 3 except employing an output selected from the outputs of the plural first thermo-sensors 15b-1 to 15b-3 by the output selection unit 1c1 as the first thermo-sensor output.

Note that the output selection unit 1c1 uses the total traveling distance as data with the passage of time, which is measured by a total traveling distance meter of a car, and divides the total traveling distance into three stages, the initial, the middle and the end, and functions to switch the first thermo-sensor sequentially in 15b-1, 15b-2 and 15b-3 as the total traveling distance of the car extends.

Thus, according to the second embodiment, the temperature distribution within the reformer changes due to the change of catalyst properties with the passage of time and the position of the peak temperature also changes. However, performing the second correction by using the output of the thermo-sensor, which is at the peak temperature position changing in response to the change with the passage of time, among the first thermo-sensors provided at plural places, makes it possible to perform accurate control for use of long period of time.

Note that, also in this second embodiment, a technique such as the model matching control can be used for the control logic of the second correction unit 1c in place of the PID control logic.

Next, a third embodiment of the present invention will be described with reference to FIG. 11. The internal temperature distribution of the reformer 15 changes not only with the passage of time but also depending on time or conditions (the target amount of fuel gas flow, or the like) as shown in FIG. 9. Thus, the second correction unit 1c in the control unit 1 having the constitution as shown in FIG. 3 can be disposed to perform the second correction by using the highest temperature among the plural first thermo-sensors 15b-1 to 15b-3.

Figure 11:
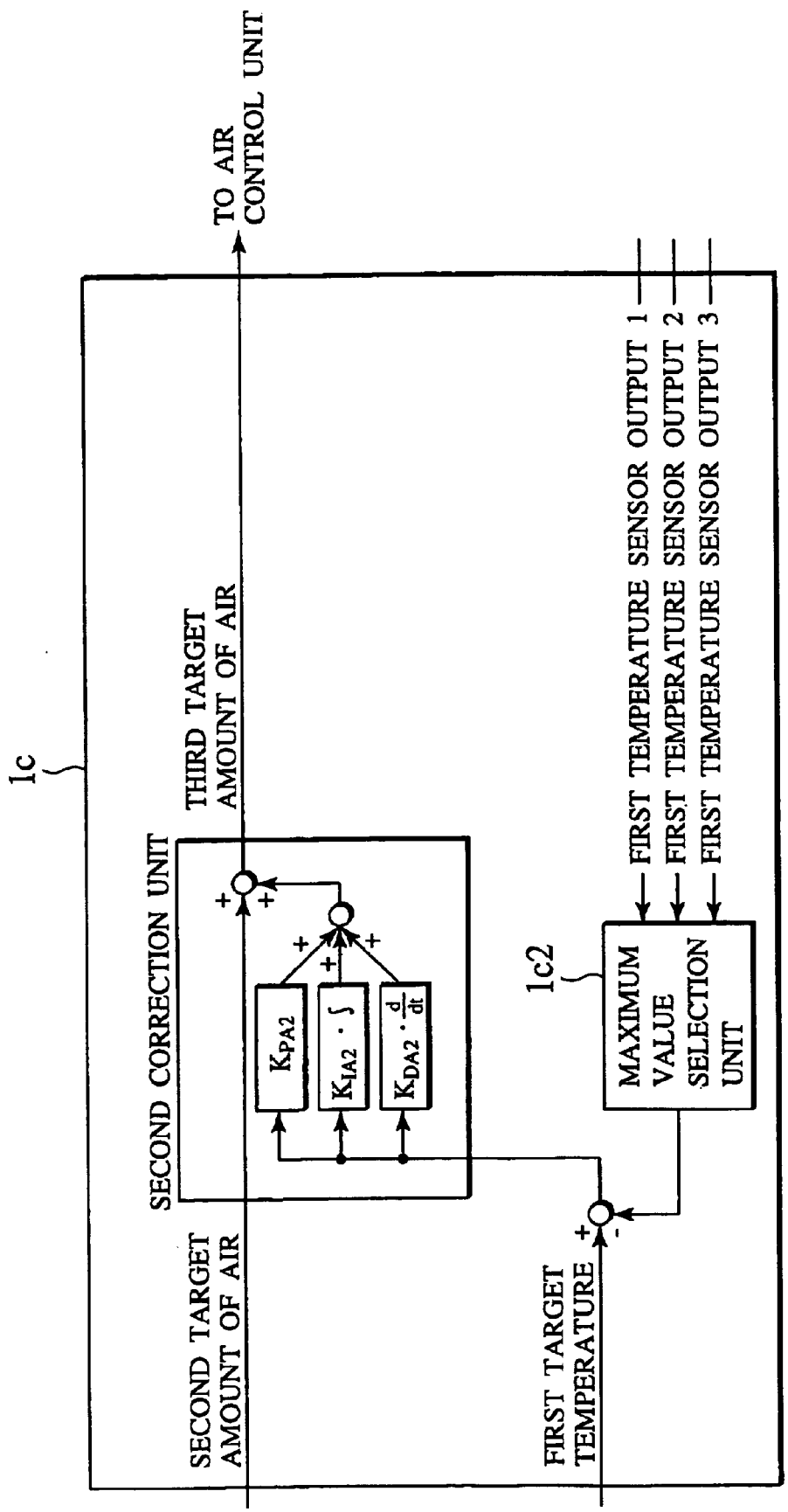
FIG. 11 is a block diagram showing a constitution of a second correction unit in a third embodiment.

The operation logic of the second correction unit 1c in the third embodiment is shown in FIG. 11. The operation logic of FIG. 11 is similar to the second correction unit 2 in the first embodiment shown in FIG. 3 except selecting the highest temperature among the plant first thermo-sensors 15b-1 to 15b-3 as the first temperature output by the maximum value selection unit 1c2, and performs the second correction according to the PID control logic.

Thus, according to the third embodiment, the temperature distribution within the reformer changes depending on time or conditions (the target amount of fuel gas flow, or the like) and the position of the peak temperature also changes. However, performing the second correction by using the highest temperature detected by the plural first thermo-sensors makes it possible to perform more accurate control.

Note that, also in this third embodiment, a technique such as the model matching control can be used for the control logic of the second correction unit 1c in place of the PID control logic.

Figure 12:
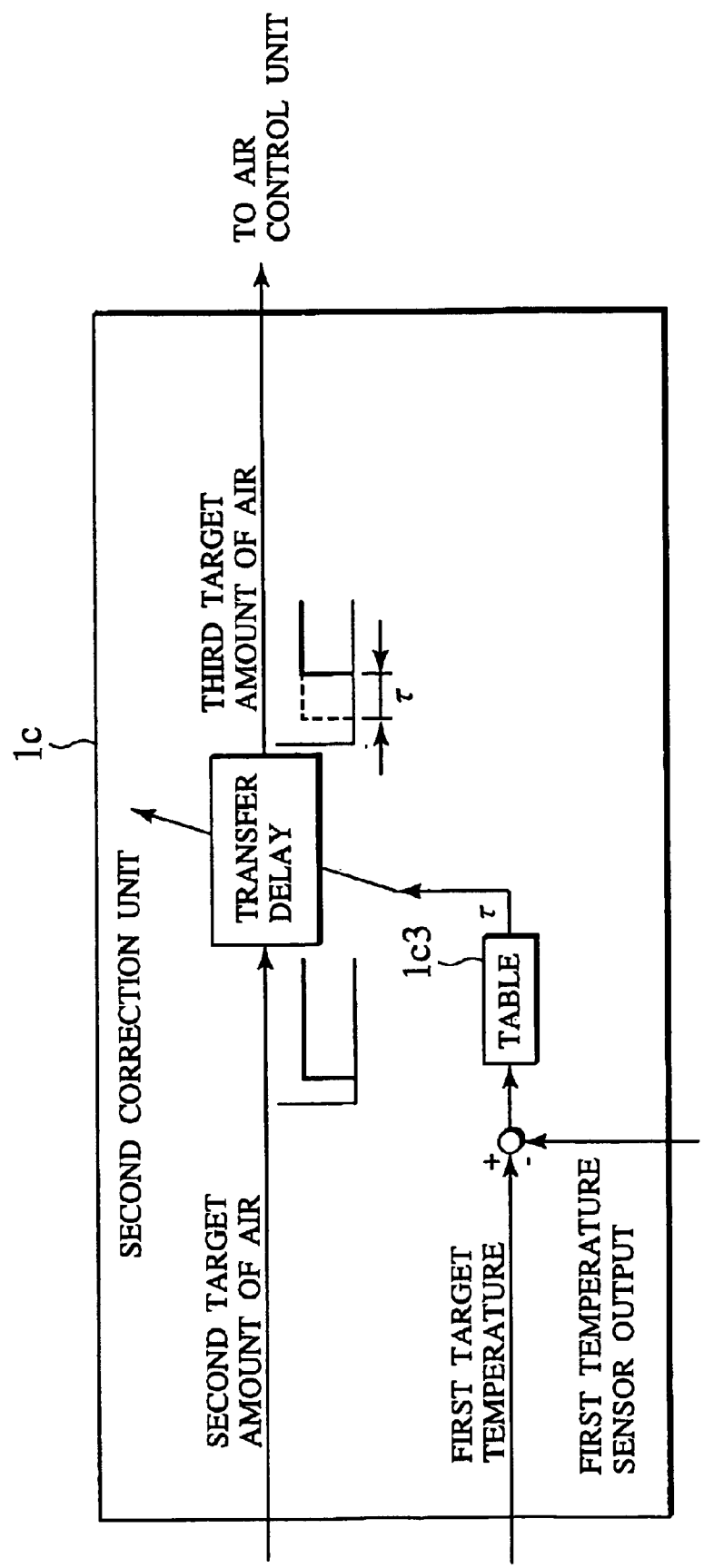
FIG. 12 is a block diagram showing a constitution of a second correction unit in a fourth embodiment.

Next, a fourth embodiment of the present invention will be described with reference to FIG. 12. FIG. 12 shows the constitution of the second correction unit 1c employed in the fourth embodiment. Since the constitutional elements except the second correction unit 1c are similar to those of the first embodiment shown in FIG. 1 and FIG. 3, their detailed descriptions are omitted.

Figure 13:
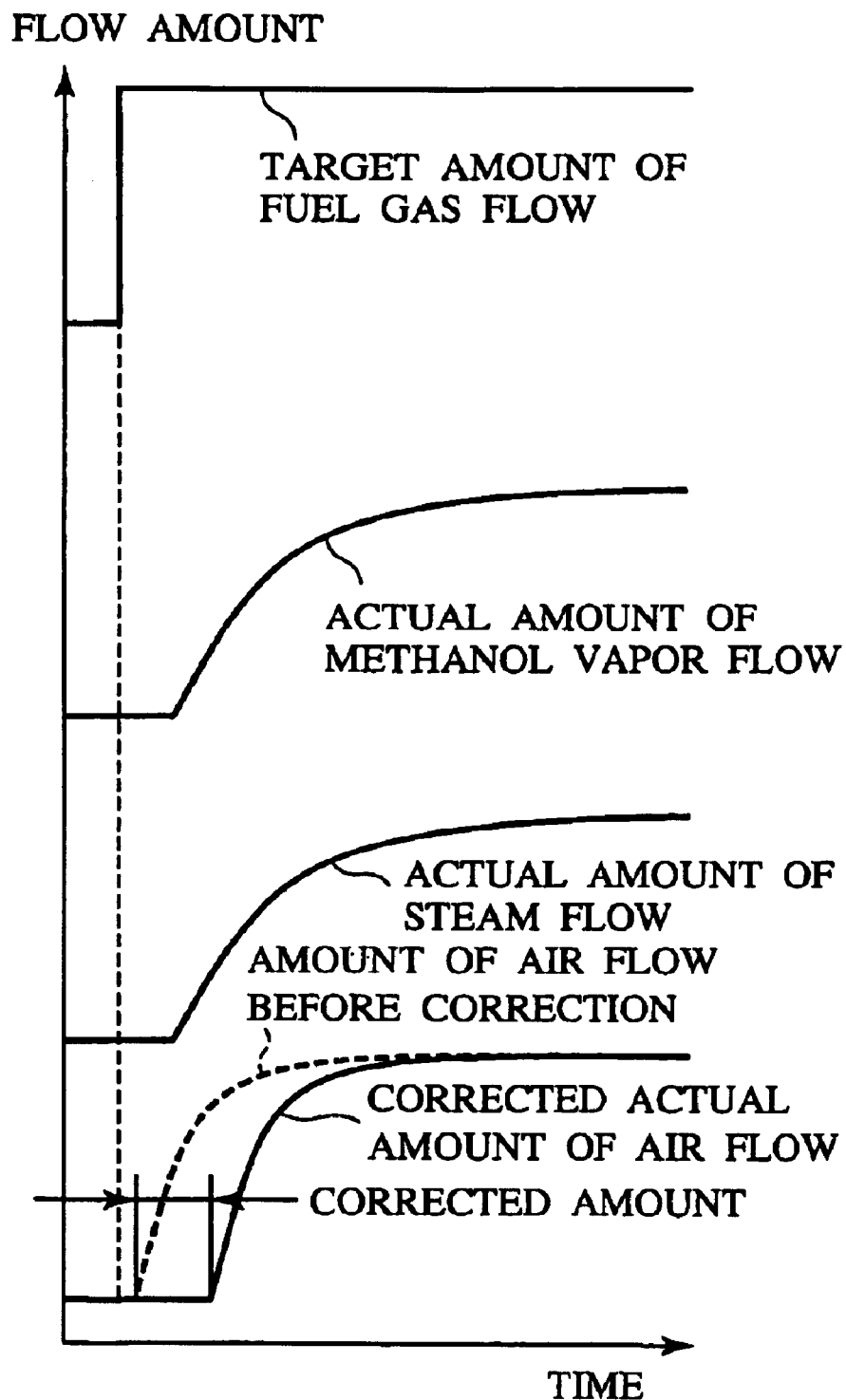
FIG. 13 is a graph showing a response characteristic of an actual flow amount of the various gases in the reformer after a correction is performed in the above-described embodiments.

As shown in FIG. 12, control logic for the second correction performed by the second correction unit 1c is constituted of delayed elements. Accordingly, the second correction unit 1c obtains the delayed time τ from the deviation between the first target temperature and the output of the first thermo-sensor by referring to the data of the table 1c3, performs the second correction such that the input second target amount of air is made to delay by this delayed time τ, and outputs it as the third target amount of air to the air control unit 1f. The state of each actual flow at this time is shown in FIG. 13.

Note that the table 1c3 for delayed time τ is the one tabled after obtaining the combinations of deviation between the first target temperature and the output of the first thermo-sensor and the delayed time τ corresponding the deviation by experiments.

In this way, the follow-up time, until the actual air flow increases in accordance with an increasing change of the target fuel gas flow, can be delayed also by the fourth embodiment to the same degree as those of the actual flow of methanol vapor and the actual flow of steam, and thereby it becomes possible to restrain the temperature rise in the upstream portion of the reformer where partial oxidation reaction mainly occurs.

In addition, in the case of the fourth embodiment, because the delayed time τ is obtained simply by referring to the table from the deviation between the first target temperature and the output of the first thermo-sensor, the amount of operation at the second correction unit can be reduced compared with the first to third embodiments, thereby the control unit can be constituted more inexpensively.

Note that, in the fourth embodiment, although the delayed time τ is obtained by referring to the table from the deviation between the first target temperature and the output of the first thermo-sensor, techniques such as the logic of PID control and the model matching control may also be used. Also, plural first thermo-sensors may be used as in the second and third embodiments.

And further, in the above-described first to fourth embodiments, thermo-sensors were used to detect the temperature states for the reaction states in the fuel reformer to which the corrector referred. However, sensors such as CO sensors, methanol sensors and hydrogen sensors for detecting the reaction state are also able to construct the similar systems. Also, though the fuel gas is produced by reforming methanol, similar systems can be constructed by using hydrocarbons such as gasoline and natural gas.

The entire content of Japanese Patent Application No. P2000-38412 with a filling date of Feb. 16, 2000, is incorporated herein by reference.

Although the invention has been described above by reference to certain embodiments of the invention, the invention is not limited to the embodiments described above will occur to these skilled in the art, in the teachings. The scope of the invention is defined with reference to the following claims.

What is claimed is:

1. A reformer controlling apparatus, comprising:
   a reformer having a catalyst unit including a catalyst promoting a steam reforming reaction and a catalyst for promoting a partial oxidation reaction;
   a raw fuel gas supplier supplying raw fuel gas containing hydrocarbon and steam to said catalyst unit;

an oxidation gas supplier supplying oxidation gas containing oxygen to said catalyst unit;

a first reaction state detector detecting a state of a reaction progressing at an upstream portion of flows of said raw fuel gas and said oxidation gas in said catalyst unit;

a second reaction state detector detecting a state of a reaction at an exit of the catalyst unit;

a first corrector correcting feed amounts of said raw fuel gas and said oxidation gas, which are supplied to said catalyst unit, based on said state of the reaction detected by said second reaction state detector; and a second corrector correcting the feed amount of said oxidation gas, which is supplied to said catalyst unit and a feed timing thereof, based on said state of the reaction detected by said first reaction state detector.

2. The reformer controlling apparatus according to claim 1, further comprising:

a third reaction state detector; and a detection signal switcher, wherein said first reaction state detector and said third reaction state detector are positioned at the upstream portion of flows of said raw fuel gas and said oxidation gas in said catalyst unit and a said detection signal switcher switches, with passage of time, a detection signal supplied to said second corrector among detection signals indicating said reaction state detected by said first reaction state detector and said third reaction state detector.

3. The reformer controlling apparatus according to claim 1, wherein said first reaction state detector detects a temperature state as said reaction state.

4. The reformer controlling apparatus according to claim 1, further comprising:

a third reaction state detector; and a maximum temperature selector, wherein said first reaction state detector and said third reaction state detector are for detecting a temperature state are and are positioned at the upstream portion of flows of said raw fuel gas and said oxidation gas in said catalyst unit, and said maximum temperature selector selects the highest temperature among detected temperatures output from the first reaction state detector and said third reaction state detector, and said second corrector uses an output of the maximum temperature selector.

5. The reformer controlling apparatus according to claim 1, wherein said second reaction state detector detects a temperature state as said reaction state.

6. A reformer controlling apparatus, comprising:

reforming means having a catalyst unit including a catalyst for promoting a steam reforming reaction and a catalyst for promoting a partial oxidation reaction;

raw fuel gas supplying means for supplying raw fuel gas containing hydrocarbon and steam to said catalyst unit;

oxidation gas supplying means for supplying oxidation gas containing oxygen to said catalyst unit;

first reaction detecting means for detecting a state of a reaction progressing at an upstream portion of flows of said raw fuel gas and said oxidation gas in said catalyst unit;

second reaction state detecting means for detecting a state of a reaction at an exit of the catalyst unit;

first correcting means for correcting feed amounts of said raw fuel gas and said oxidation gas, which are supplied to said catalyst unit, based on said state of the reaction detected by said second reaction state detector means; and second correcting means for correcting the feed amount of said oxidation gas, which is supplied to said catalyst unit and a feed timing thereof, based on said state of the reaction detected by said first reaction state detecting means.

* * * * *